(12) United States Patent
Kwon

(10) Patent No.: US 12,380,711 B2
(45) Date of Patent: Aug. 5, 2025

(54) MONITORING SYSTEM FOR ONE OR MORE OBJECTS STORED IN A VEHICLE

(71) Applicant: TOYOTA RESEARCH INSTITUTE, INC., Los Altos, CA (US)

(72) Inventor: Ha-Kyung Kwon, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 356 days.

(21) Appl. No.: 17/589,392

(22) Filed: Jan. 31, 2022

(65) Prior Publication Data

US 2023/0245473 A1 Aug. 3, 2023

(51) Int. Cl.
| | |
|---|---|
| *G06V 20/59* | (2022.01) |
| *B60W 50/16* | (2020.01) |
| *G06T 7/246* | (2017.01) |
| *G06T 7/73* | (2017.01) |
| *G06V 10/82* | (2022.01) |
| *G06V 20/64* | (2022.01) |
| *B60W 50/14* | (2020.01) |

(52) U.S. Cl.
CPC ............. *G06V 20/59* (2022.01); *B60W 50/16* (2013.01); *G06T 7/251* (2017.01); *G06T 7/75* (2017.01); *G06V 10/82* (2022.01); *G06V 20/64* (2022.01); *B60W 2050/143* (2013.01); *B60W 2050/146* (2013.01); *G06T 2207/20081* (2013.01); *G06T 2207/20084* (2013.01); *G06T 2207/30268* (2013.01)

(58) Field of Classification Search
CPC ........ G06V 20/59; G06V 10/82; G06V 20/64; G06V 20/52; B60W 50/16; B60W 2050/143; B60W 2050/146; G06T 7/251; G06T 7/75; G06T 2207/20081; G06T 2207/20084; G06T 2207/30268; G06T 2207/30232; G06T 7/0002
See application file for complete search history.

(56) References Cited

U.S. PATENT DOCUMENTS

| | | | |
|---|---|---|---|
| 2004/0100378 A1* | 5/2004 | Hollnagel | B60R 25/102 |
| | | | 340/425.5 |
| 2015/0254600 A1 | 9/2015 | Murthy et al. | |
| 2016/0148440 A1* | 5/2016 | Kwak | G07C 5/085 |
| | | | 701/31.5 |

(Continued)

FOREIGN PATENT DOCUMENTS

| | | |
|---|---|---|
| EP | 3648073 A1 | 5/2020 |
| WO | 2016179715 A1 | 11/2016 |

OTHER PUBLICATIONS

Arviem, "Shipping Container Monitoring, Cargo Security, Location & Condition Monitoring," retrieved from arviem.com on Jan. 31, 2022.

*Primary Examiner* — Oneal R Mistry
*Assistant Examiner* — Jongbong Nah
(74) *Attorney, Agent, or Firm* — Seyfarth Shaw LLP

(57) ABSTRACT

A method for monitoring cargo in a vehicle is presented. The method includes identifying a first object placed within the vehicle. The method also includes monitoring the first object during transportation of the first object, by the vehicle, from a first location to a second location. The method further includes predicting potential damage to the first object or a second object based on monitoring the first object. The method still further includes generating an alert based on predicting the potential damage.

15 Claims, 6 Drawing Sheets

(56) References Cited

U.S. PATENT DOCUMENTS

| | | |
|---|---|---|
| 2017/0017502 A1 | 1/2017 | Gross et al. |
| 2018/0244187 A1* | 8/2018 | Strano .................... H04N 7/183 |
| 2019/0057608 A1* | 2/2019 | Anderson .............. G06V 20/59 |
| 2020/0207289 A1* | 7/2020 | Scheufler .................. B60P 1/00 |
| 2020/0409929 A1 | 12/2020 | Kodavarti et al. |
| 2021/0248396 A1* | 8/2021 | Sim ......................... B60R 11/04 |

* cited by examiner

MONITORING SYSTEM FOR ONE OR MORE OBJECTS STORED IN A VEHICLE

BACKGROUND

Field

Certain aspects of the present disclosure generally relate to monitoring one or more objects stored in a vehicle and, more particularly, to a system and method for monitoring forces acting on one or more objects stored in a vehicle.

Background

Most vehicles include a cargo-hold, such as a trunk, for storing an item (e.g., cargo) while the vehicle transports the item from one location to another. Prior to transporting the item, a human, or autonomous device, may arrange the item within the cargo-hold based on their intuition and/or prior experiences to determine an appropriate location for each item. In such examples, the item may be arranged to minimize movement and prevent damage to the item that may be caused based on the movement. Still, in some cases, the item may be placed inappropriately. In some such examples, the item may not properly fit in a selected location or may not be properly secured at the selected location. In such examples, the item may be damaged due to normal movement of the vehicle during transport. Alternatively, abnormal operation of the vehicle may damage the cargo during transport. Such abnormal operation may include excess speed or movement that increase an amount of force exerted on the item. As such, there is a need to monitor one or both of movement of the item during transport or forces acting on the item during transport.

SUMMARY

In one aspect of the present disclosure, a method for monitoring cargo in a vehicle includes identifying a first object placed within the vehicle. The method further includes monitoring the first object during transportation of the first object, by the vehicle, from a first location to a second location. The method still further includes predicting potential damage to the first object or a second object based on monitoring the first object. The method also includes generating an alert based on predicting the potential damage.

Another aspect of the present disclosure is directed to an apparatus including means for identifying a first object placed within the vehicle. The apparatus further includes means for monitoring the first object during transportation of the first object, by the vehicle, from a first location to a second location. The apparatus still further includes means for predicting potential damage to the first object or a second object based on monitoring the first object. The apparatus also includes means for generating an alert based on predicting the potential damage.

In another aspect of the present disclosure, a non-transitory computer-readable medium with non-transitory program code recorded thereon is disclosed. The program code is executed by a processor and includes program code to identify a first object placed within the vehicle. The program code further includes program code to monitor the first object during transportation of the first object, by the vehicle, from a first location to a second location. The program code still further includes program code to predict potential damage to the first object or a second object based on monitoring the first object. The program code also includes program code to generate an alert based on predicting the potential damage.

Another aspect of the present disclosure is directed to an apparatus for monitoring an object in a vehicle. The apparatus includes a processor, and a memory coupled with the processor and storing instructions operable, when executed by the processor, to cause the apparatus to identify a first object placed within the vehicle. Execution of the instructions further cause the apparatus to monitor the first object during transportation of the first object, by the vehicle, from a first location to a second location. Execution of the instructions also cause the apparatus to predict potential damage to the first object or a second object based on monitoring the first object. Execution of the instructions still further cause the apparatus to generate an alert based on predicting the potential damage.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
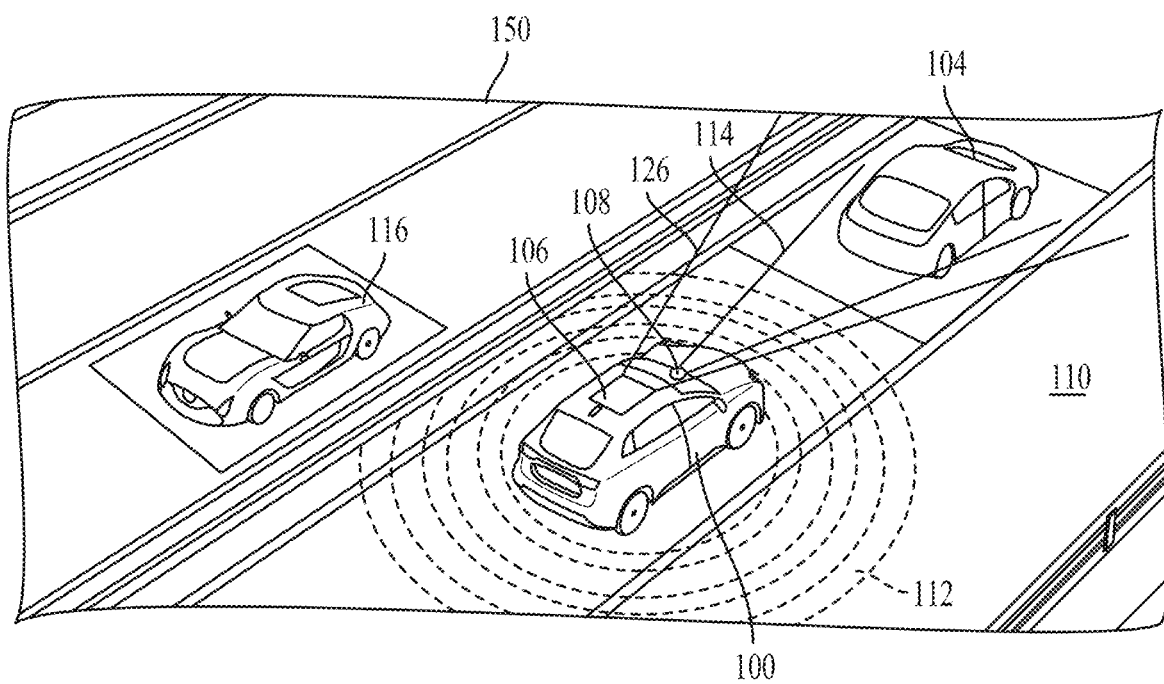
FIGS. 1A and 1B are diagram illustrating examples of a vehicle, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Most vehicles include a cargo-hold, such as a trunk, for storing an object (e.g., cargo) while the vehicle transports the object from one location to another. As an example, some vehicles, such as sedans, may have a cargo area in the form of an enclosed trunk at the rear of the vehicle. Other vehicles, such as sport utility vehicles (SUVs), may have a cargo area that is not separated from the rest of the vehicle interior, but rather divided therefrom by virtue of seats/seat mode ("up" in seating position or "down" in cargo position). Still some other vehicles, such as trucks, have still another type of cargo area in the form of an open truck bed. Other vehicles, may have various cargo areas throughout the interior of the vehicle (e.g., cubbies, glove compartments, etc.) or in other areas external to the vehicle's internal space. For example, rear-engine vehicles may have a cargo area located under the front hood.

Cargo areas may be used to store objects, hold/support objects during transport, and so on. Cargo areas can be configurable. For example, the cargo area of an SUV may comprise a cargo area having some first cargo capacity when the rear seats of the SUV are in the up/seating position or mode. That same cargo area can be expanded to comprise some second cargo capacity when the rear seat(s) of the SUV are in the down/cargo mode.

Prior to transporting the object, a human, or autonomous device, may arrange the object within the cargo-hold based on their intuition and/or prior experiences to determine an appropriate location for each object. In such examples, the object may be arranged to minimize movement and prevent damage to the object that may be caused based on the movement. Still, in some cases, the object may be placed inappropriately. In some such examples, the object may not properly fit in a selected location or may not be properly secured at the selected location. In such examples, the object may be damaged due to normal movement of the vehicle during transport. Alternatively, abnormal operation of the vehicle may damage the cargo during transport. Such abnormal operation may include excess speed or movement that increase an amount of force exerted on the object.

For example, during acceleration events (that can result in a vehicle lurching forward), objects in a cargo area may move or shift in the opposite direction. For example, during a braking event, objects contained in or by the cargo area can move or shift forward from an initial position. In another example, objects in the cargo area may shift when a vehicle navigates a turn. As such, there is a need to monitor movement of the object during transport and/or forces acting on the object during transport.

Various aspects of the present disclosure are directed to a monitoring system that monitors movement of objects during transport and/or forces acting on the objects during transport. Some aspects more specifically relate to a system that monitors the movement and/or forces acting on one or more objects located within the vehicle. In some examples, the movement and/or forces may be monitored in real-time. Additionally, in some examples, the system monitors an operation of the vehicle, such as one or both of driver behavior or vehicle dynamics, to determine (e.g., predict) the forces that may act on the one or more objects.

Based on the monitoring of the objects and/or forces, the system may determine if a warning should be issued to the driver. The warning may indicate that the one or more objects are stored improperly and that the driver should either put them in a different location. In some examples, the different location may be suggested by the system. Additionally, or alternatively, the warning may indicate that the driver should modify their driving behavior to prevent damage to the one or more objects.

In some examples, one or more sensors integrated with the vehicle may monitor an item placed within the vehicle. The sensors may include, for example, perception sensors (for example, one or more cameras), radar sensors, sonar sensors, and/or LIDAR sensors. Additionally, one or more force measuring sensors, such as longitudinal and/or lateral accelerometers, may be integrated with the vehicle to determine forces acting on the items placed within the vehicle.

It should also be noted that vehicle passengers or operators may place cargo/objects on the seats of a vehicle, in a door cubby, or on some other surface or area of the vehicle. Currently, when packing or arranging items to be stored or transported in a vehicle, a person has no guidance on how to arrange those items in the vehicle's cargo space(s) or other areas, nor is a person made aware of potentially unsecure, or even dangerous, placement of an item(s). Conventional vehicles may provide certain cargo accessories such as cargo nets to mitigate shifting/movement of items. Conventional vehicles may also provide various partitions or "sub-areas" in a cargo area meant to hold/contain certain objects/types of objects, or to hold/contain items of a certain size(s), etc.

However, placement and orientation of an item(s) as well as use of cargo accessories is nevertheless left to the judgment of a user (vehicle operator, passenger, or other person(s) depositing items in a vehicle). It is not unusual for a person to select an inappropriate location for cargo. In some cases, a person may force cargo into a cargo area (or other area of the vehicle) that should not be used for cargo, or the cargo may not be properly secured. In still other instances, even if a person "properly" places/locates cargo, during vehicle use, as noted above, that cargo may move or shift.

Moreover, that movement or shifting can vary depending on vehicle operating dynamics. For example, placement of an item in a cargo area may be appropriate, e.g., safe, when the vehicle is being operated in a more controlled manner, e.g., non-excessive speeds, and with less aggressive vehicle maneuvering. However, if that same vehicle is operated in a more aggressive manner, what may have been an appropriate location for an item ceases to be appropriate, as the item can be more prone to moving or commensurately more aggressive shifting.

Various embodiments of the present disclosure are also directed to cargo optimization, in particular, improvements rooted in computer technology for improving the storage of cargo/use of cargo space or area(s). In some embodiments, recommendations regarding the stowing or placement/orienting of cargo may be provided to a user or person packing or stowing cargo. Although embodiments disclosed herein may be related to optimizing cargo in a vehicular context, embodiments can be used or adapted for optimizing the storage of cargo in any context or environment.

In some embodiments, a recommendation system or engine may improve cargo storage in a vehicle by considering one or more of the characteristics of the cargo itself (e.g., size and shape), driver behavior associated with the vehicle, vehicle characteristics, or vehicle operating dynamics. The driver behavior may be driver behavior monitored (e.g., sensed) over a period of time or in real-time, while vehicle dynamics can be real-time vehicle operating dynamics, such as speed, yaw, roll, etc. Vehicle dynamics can also refer to third-party-provided vehicle dynamics data or information (e.g., from the vehicle manufacturer), as well as historical data reflecting vehicle operating dynamics relative to certain loads. Further still, vehicle dynamics data can be related to or based on road conditions, such as physical roadway characteristics (e.g., existence of potholes, for example), dynamic environmental considerations such as the weather, as well as traffic conditions, or other factors that may impact vehicle operating dynamics.

It should be noted that terms, such as "optimize," "optimal," and the like, may be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
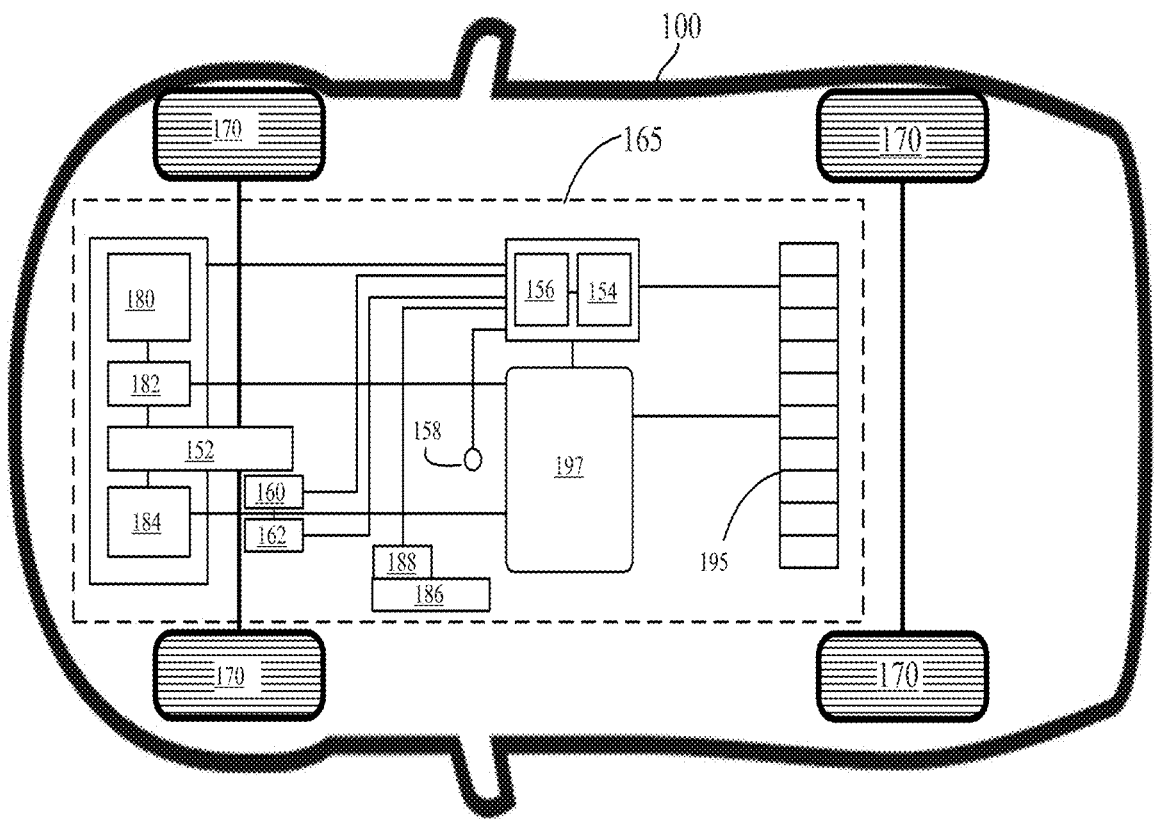

FIG. 1B is a diagram illustrating an example the vehicle 100 in which various aspects of the present disclosure may be implemented. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
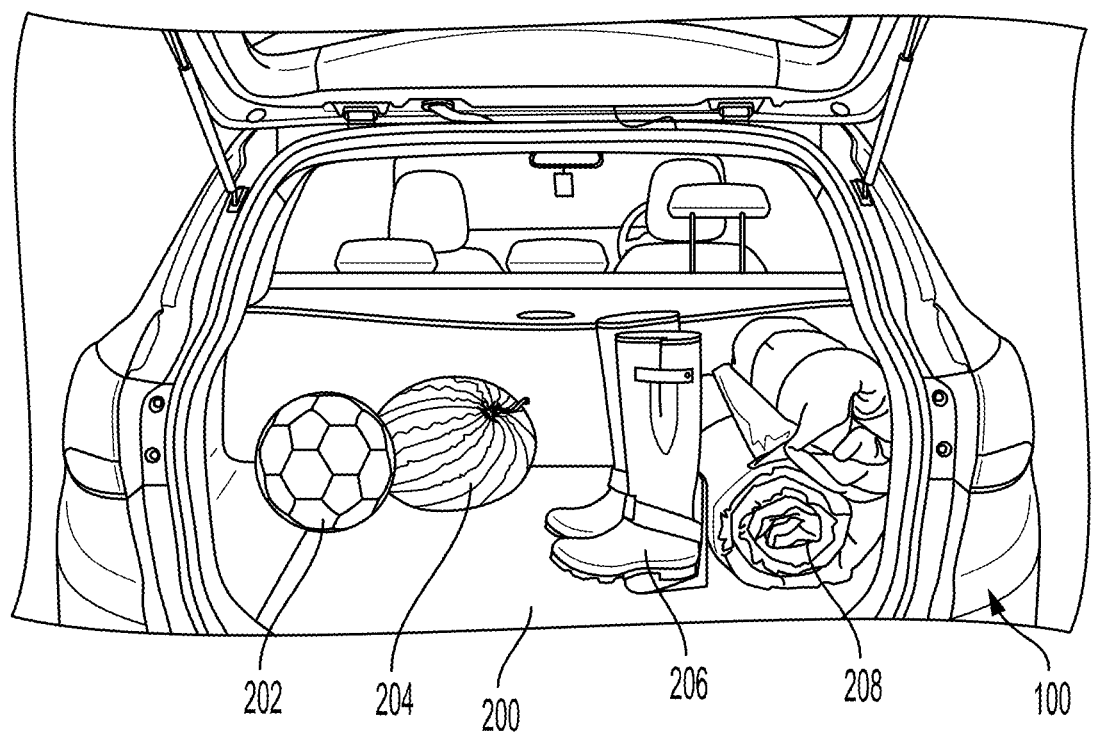
FIG. 2 is a diagram illustrating an example of objects in a trunk of a vehicle, in accordance with aspects of the present disclosure.

FIG. 2 is a diagram illustrating an example of objects 202, 204, 206, 208 in a trunk 200 of a vehicle 100, in accordance with aspects of the present disclosure. In the example of FIG. 2, the trunk 200 is located at the rear end of the vehicle 100. Aspects of the present disclosure are not limited to monitoring the trunk 200 at the rear end of the vehicle 100, other locations, such as a front storage area, roof storage area, interior storage area, and/or another storage area may be monitored. As shown in the example of FIG. 2, the trunk 200 may be loaded with a ball 202, a watermelon 204, boots 206, and sleeping bags 208. The objects 202, 204, 206, 208 in the trunk 200 are shown for exemplary purposes, other types of objects are contemplated. The objects 202, 204, 206, 208 may also be referred to as items or cargo.

In some examples, when an object 202, 204, 206, or 208 is placed in the trunk 200, an object recognition system may identify the object 202, 204, 206, or 208 based on information provided by one or more sensors (not shown in FIG. 2) integrated with the vehicle 100. In some such examples, objects 202, 204, 206, 208 placed in the trunk 200 may be within view of the one or more sensors. As an example, the object recognition system identifies the ball 202 based on previous object recognition training. The object recognition system may also determine a fragility of each object 202, 204, 206, 208 based on previous training. The objection recognition system may be a component of the monitoring system or may be an independent system that works in conjunction with the monitoring system.

In one example, based on prior training, the object recognition system may determine the watermelon 204 is more fragile than the ball 202. In some examples, the fragility may be a binary value, such as a value that indicates whether the object 202, 204, 206, or 208 is breakable or unbreakable. In such examples, the ball 202, boots 206, and sleeping bags 208 may be identified as unbreakable, and the watermelon 204 may be identified as breakable.

In other examples, the fragility may be associated with a fragility score, where each object 202, 204, 206, 208 is associated with one fragility score within a range of fragility scores. A higher fragility score indicates a greater fragility. In such examples, the range of fragility scores may be from zero (e.g., not fragile) to one (e.g., very fragile). The ball 202, boots 206, and sleeping bags 208 may receive a fragility score of zero (e.g., each object 202, 206, 208 may not break upon impact) and the watermelon 204 may receive a fragility score of 0.5 (e.g., may break upon strong impact). In one such example, glass or other fragile items (not shown in FIG. 2) may receive a fragility score of one. In some examples, the object recognition system may cross-reference a particular object 202, 204, 206, or 208 with a database of fragility scores to determine the fragility score associated with the particular object 202, 204, 206, or 208.

Additionally, or alternatively, a human, such as a person placing the items in the vehicle 100 or an occupant of the vehicle 100, may classify one or more of the objects 202, 204, 206, 208 as breakable, unbreakable, possibly breakable, etc., or assign a fragility score to one or more of the objects 202, 204, 206, 208. Additionally, or alternatively, in some examples, a weight of each object 202, 204, 206, 208 may be registered when each object 202, 204, 206, 208 is placed within the trunk 200. The weight may be determined based on a scale located in the trunk and/or historical data. The monitoring system may also obtain other physical properties for each object 202, 204, 206, 208, such as a volume, a material of the object, or other properties. The physical properties, such as the weight, volume, object material, and/or other properties may be used as a factor in determining a fragility of an object 202, 204, 206, 208.

Figure 3:
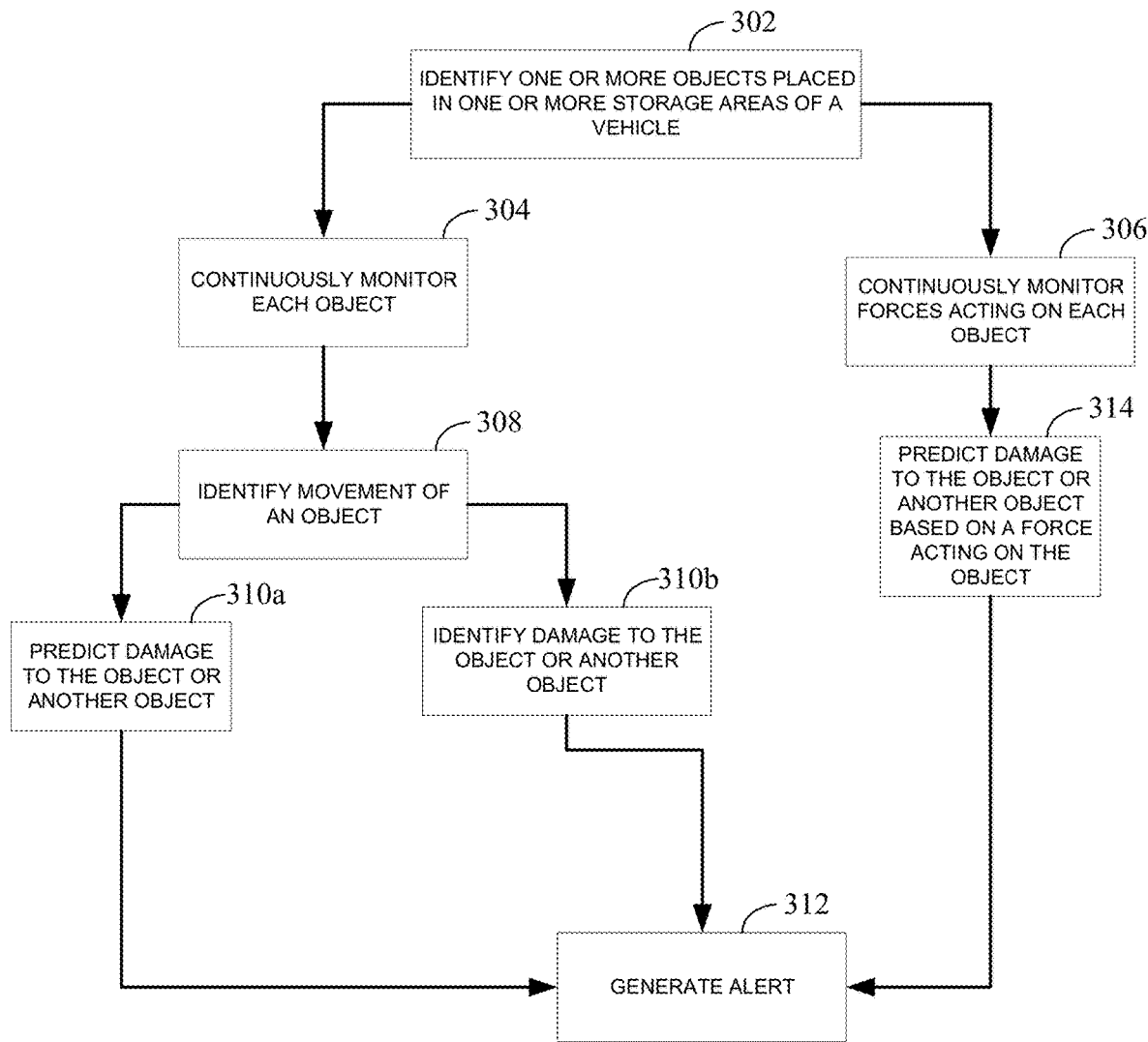
FIG. 3 is a flow diagram illustrating an example of a process for monitoring objects in a vehicle, in accordance with aspects of the present disclosure.

After the objects 202, 204, 206, 208 are placed in the trunk 200, the monitoring system may monitor each object 202, 204, 206, 208 while the vehicle 100 is transporting the items from one location to another. FIG. 3 is a flow diagram illustrating an example of a process 300 for monitoring objects in a vehicle, in accordance with aspects of the present disclosure. In the example of FIG. 3, the vehicle may be a vehicle 100 as described with reference to FIGS. 1 and 2. Additionally, the objects may be examples of the objects 202, 204, 206, 208 described with reference to FIG. 2. The process 300 may be performed by an object monitoring system. In some examples, the object monitoring system may be a component, such as non-generic hardware and/or software that is specified to monitor objects and/or forces acting on objects, integrated with the vehicle.

As shown in FIG. 3, the process 300 begins at block 302 by identifying one or more objects, such as the objects 202, 204, 206, 208 described with reference to FIG. 2, placed in one or more storage areas of the vehicle, such as a trunk 200 described with reference to FIG. 2. As discussed, the process of identifying the one or more objects may include determining a fragility of each object placed in the vehicle based on information obtained from one or more sensors of the vehicle.

At block 304, the object monitoring system may monitor each object, identified at block 302, that is placed within view or range of one or more sensors associated with the object monitoring system. Additionally, or alternatively, at block 306, the object monitoring system may monitor forces, such as natural forces (e.g., gravity), acting on each object identified at block 302. The forces may be monitored by one or more sensors, such as an accelerometer, associated with the monitoring system. The monitoring at blocks 304 and 306 may be performed in real-time, or substantial real-time. After the objects are placed within the vehicle, the vehicle may travel to a destination. In the example of FIG. 3, the process 300 may continuously monitor each object (block 304) and/or forces acting upon each object (block 306) during a duration of a trip, prior to the trip, and after the trip.

In some aspects, the monitoring may be limited to occasions when the vehicle is active. An active vehicle may be a vehicle that is on (e.g., active engine) or a vehicle that is moving. In some aspects, the continuous monitoring at blocks 304 and/or 306 may be periodic, such as once every second.

In some examples, the monitoring of each object at block 304 may identify movement of an object at block 308. In some examples, an object may move due to natural forces, such as gravity, acting on the object while the vehicle travels to the destination. In some such examples, the natural forces may be caused by normal operation of the vehicle. As an example, the ball 202 and/or the watermelon 204, described with reference to FIG. 2, may move based on natural forces caused by acceleration or deceleration of the vehicle. In such an example, movement of the ball 202 may damage the watermelon 204 if the ball 202 collides with the watermelon 204. Additionally, or alternatively, movement of the watermelon 204 may damage the watermelon 204 based on a collision with any object 202, 206, 208 in the trunk 200 or with a surface of the trunk 200.

Based on observing the movement of an object, at block 308, in some aspects, the object monitoring system may predict whether the movement of the object will damage the object itself or another object in the vehicle (block 310a). That is, movement of the object may cause the object to interact with one or more other objects. As discussed, the ball 202 may move and damage the watermelon 204, even though the watermelon 204 may not move based on natural forces caused by the operation of the vehicle 100. Alternatively, based on observing the movement of an object, at block 308, in some aspects, the object monitoring system may determine that the object has been damaged (block 310b).

In some aspects, prior to observing damage to the object itself or to another object in the vehicle, the object monitoring system may generate an alert at block 312. In some other aspects, the alert at block 312 may be generated based on identifying damage to the object or another object based on movement of the object (block 310b). In such aspects, the alert may be generated based on predicting potential damage (block 310a) or identifying actual damage to the object (block 310b) in response to observing movement of the object (block 308). The alert may be output via one or more of an audio notification, a visual notification, or a haptic notification. The audio notification may be generated via an audio system, such as a vehicle speaker system, working in conjunction with the object monitoring system. The visual notification may be generated via a visual system, such as a vehicle display system, working in conjunction with the object monitoring system. The haptic notification may be generated via a haptic feedback system, such as a steering wheel feedback system or seat feedback system, working in conjunction with the object monitoring system.

In some examples, the alert may be a binary alert indicating that one or more items are prone to damage. In such examples, the binary alert includes an alert state that indicates potential damage or actual damage, and a non-alert state that is silent until the object monitoring system predicts potential damage or observes actual damage. In some other examples, the alert may provide additional information, such as which item is prone to damage or has been damaged. The alert may also provide one or more suggestions to mitigate potential damage (e.g., future damage). Such suggestions may include suggesting that the driver modify their driving behaviors and/or move the object to another location. The suggested location may be provided based on the vehicle dynamics, driver behavior, and/or physical properties of the object. A driver of the vehicle may modify their driving behavior and/or move one or more objects based on receiving the alert.

As discussed, at block 306, the object monitoring system monitors forces acting upon each object (block 306). In such examples, at block 314, the object monitoring system may predict that an object may be damaged as a result of forces acting on the object and/or the object may damage another object based on the forces acting on the object. As an example, one or more sensors associated with the object monitoring system may monitor gravitational forces acting on an object, such as the boots 206 described in FIG. 2. In such an example, the object monitoring system may determine that the gravitational force may cause the boots 206 to topple as a result of the natural forces (e.g., gravity). In this example, based on learned properties of the boots 206 and the other object 202, 204, 208, the object monitoring system may predict that even if the boots 206 were to topple, the boots 206 may not damage the other objects 202, 204, 208.

In some aspects, the object monitoring system may predict that an object may move from its current location to a new location based on one or more natural forces acting on the object. Additionally, the object monitoring system may predict whether the movement of one object will affect (e.g., damage) another object. Such predictions may be determined based on properties of the objects that may be learned via training, obtained via one or more sensors in the vehicle, such as a weight sensor or a visual sensor, and/or obtained via user input.

In some aspects, the object monitoring system may be trained to account for inherent object properties, such as fragility, distribution of weight, hardness, etc., that may change over time. Additionally, or alternatively, the object monitoring system may monitor the changes to inherent object properties. In one example, a bag of ice may melt over time, changing its fragility and distribution of weight. In another example, a paper bag containing items will crinkle over time, changing the fragility of the bag itself as well as the fragility and weight distribution of items held within. Therefore, in such aspects, the object monitoring system may determine inherent properties of an object and observe and/or predict how these properties change over time. Such predictions may be used to determine if natural forces acting on an object may cause the object to be damaged or cause the object to damage another object.

In the example of FIG. 3, if the object monitoring system predicts that the natural forces acting on an object may cause the object to be damaged or cause the object to damage another object, the object monitoring system may generate an alert at block 312. Additionally, or alternatively, the object monitoring system may continue to monitor forces acting on the object.

As discussed, an object within the vehicle may move based on natural forces acting on the object. In some examples, the natural forces may be caused due to normal vehicle operation, such as turning on a road, accelerating, declaration, or changing lanes. In other examples, the natural forces may be caused by abnormal operations, such as swerving, rapid acceleration, or rapid deceleration. In some aspects, one or more sensors associated with the object monitoring system may observe the movement of an object based on natural forces acting on the object. In some examples, an object may also move in response to a collision with another object that is moving.

Figure 4:
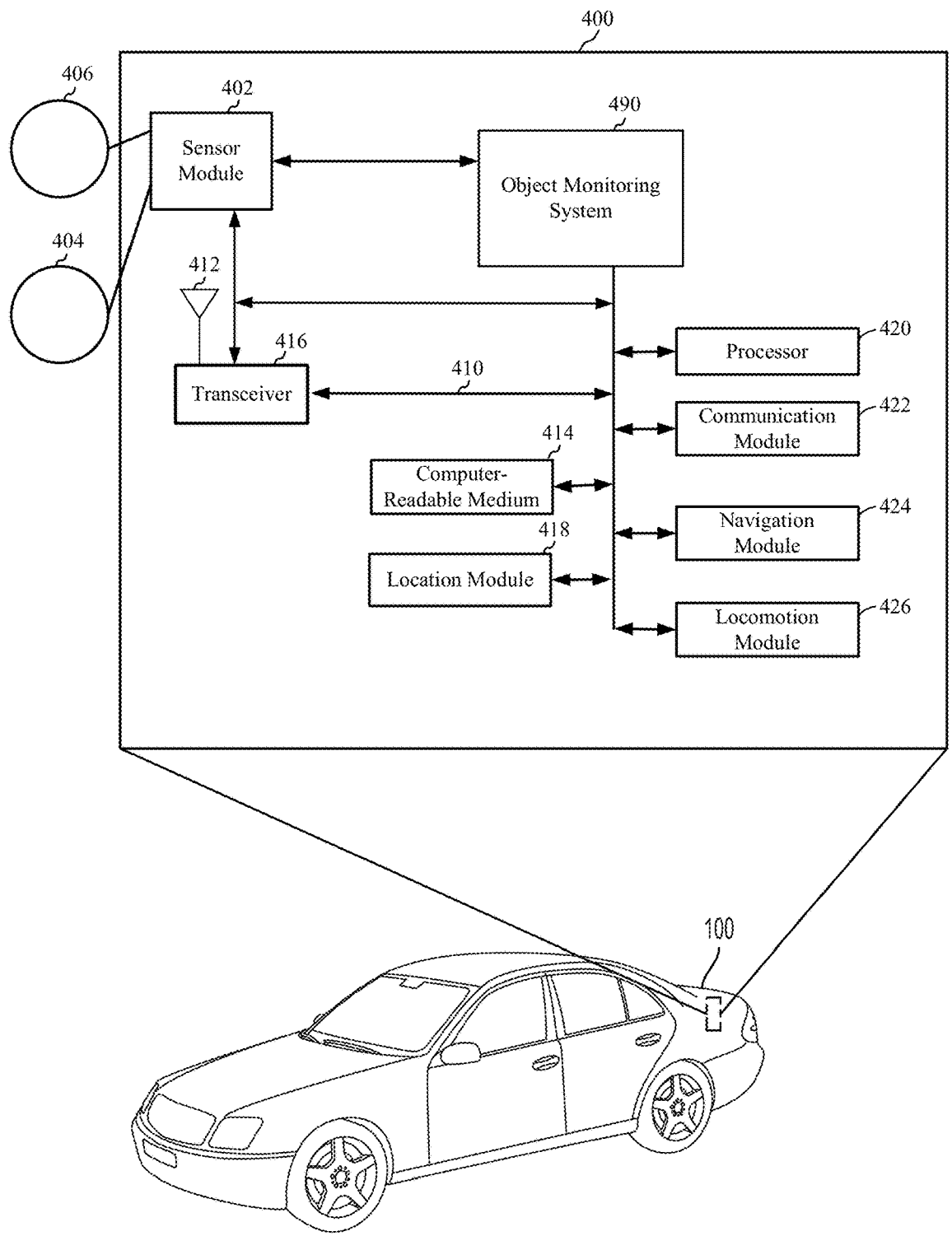
FIG. 4 is a diagram illustrating an example of a hardware implementation for a vehicle control system comprising an object monitoring system, in accordance with aspects of the present disclosure.

FIG. 4 is a diagram illustrating an example of a hardware implementation for a vehicle control system 400, according to aspects of the present disclosure. The vehicle control system 400 may be a component of a vehicle, a robotic device, or other device. For example, as shown in FIG. 4, the vehicle control system 400 is a component of a vehicle 100. Aspects of the present disclosure are not limited to the vehicle control system 400 being a component of the vehicle 100, as other devices, such as a bus, boat, drone, or robot, are also contemplated for using the vehicle control system 400. In the example of FIG. 4, the vehicle system may include an object monitoring system 490. In some examples, vehicle control system 400 is configured to perform operations, including operations of the processes 300 and 500 described with reference to FIGS. 3 and 5, respectively.

The vehicle control system 400 may be implemented with a bus architecture, represented generally by a bus 440. The bus 440 may include any number of interconnecting buses and bridges depending on the specific application of the vehicle control system 400 and the overall design constraints. The bus 440 links together various circuits including one or more processors and/or hardware modules, represented by a processor 420, a communication module 422, a location module 418, a sensor module 402, a locomotion module 426, a planning module 424, and a computer-readable medium 414. The bus 440 may also link various other circuits such as timing sources, peripherals, voltage regulators, and power management circuits, which are well known in the art, and therefore, will not be described any further.

The vehicle control system 400 includes a transceiver 416 coupled to the processor 420, the sensor module 402, a comfort module 408, the communication module 422, the location module 418, the locomotion module 426, the planning module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the comfort module 408 to a server (not shown).

In one or more arrangements, one or more of the modules 402, 408, 414, 416, 418, 420, 422, 424, 426, 490, can include artificial or computational intelligence elements, such as, neural network, fuzzy logic or other machine learning algorithms. Further, in one or more arrangements, one or more of the modules 402, 408, 414, 416, 418, 420, 422, 424, 426, 490 can be distributed among multiple modules 402, 408, 414, 416, 418, 420, 422, 424, 426, 490 described herein. In one or more arrangements, two or more of the modules 402, 408, 414, 416, 418, 420, 422, 424, 426, 490 of the vehicle control system 400 can be combined into a single module.

The vehicle control system 400 includes the processor 420 coupled to the computer-readable medium 414. The processor 420 performs processing, including the execution of software stored on the computer-readable medium 414 providing functionality according to the disclosure. The software, when executed by the processor 420, causes the vehicle control system 400 to perform the various functions described for a particular device, such as the vehicle 428, or any of the modules 402, 408, 414, 416, 418, 420, 422, 424, 426, 490. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The first sensor 406 may be used to determine a number of passengers in a compartment. The first sensor 406 may also be used to determine weather conditions, such as rain or fog, as well as detecting other conditions, such as a foggy window. The second sensor 404 may be a climate sensor used for determining temperature, humidity, and/or other climate components. Of course, aspects of the present disclosure are not limited to the aforementioned sensors as other types of sensors, such as, for example, light detection and ranging (LIDAR), a radio detection and ranging (RADAR), sonar, and/or lasers are also contemplated for either of the sensors 404, 406. The measurements of the first sensor 406 and the second sensor 404 may be processed by one or more of the processor 420, the sensor module 402, the comfort module 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the vehicle control system 400. Additionally, or alternatively, the communication module 422 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 426 may be used to facilitate locomotion of the vehicle 428. As an example, the locomotion module 426 may control movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The vehicle control system 400 also includes the planning module 424 for planning a route or controlling the locomotion of the vehicle 428, via the locomotion module 426. A route may be planned to a passenger based on compartment data provided via the comfort module 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The object monitoring system 490 may be in communication with the sensor module 402, the transceiver 416, the processor 420, the communication module 422, the location module 418, the locomotion module 426, the planning module 424, and the computer-readable medium 414. In one configuration, the comfort module 408 receives sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the comfort module 408 may receive sensor data directly from the first sensor 406 and the second sensor 404.

In one configuration, working in conjunction with one or more of the sensors 404, 406 and/or the sensor module 402, the object monitoring system 490 may identify a first object placed within the vehicle. The first object may be an example of one of the objects 202, 204, 206, 208 described with reference to FIG. 2. In some examples, the object monitoring system 490 may determine a weight and/or volume of an object. The volume of the object may be determined by data entry by a person or by estimations obtained via a picture of the object. The picture may be captured by one or more sensors 404, 406 and/or provided by a human. Weight may be determined by data entry or by estimations based on the picture of the object. For example, if the object is a grocery bag, the system may utilize an estimated weight based on historical data or other information. Volume or weight data may also be determined if the object includes identifying information, such as a barcode, that would allow the system to retrieve volume/weight information from an external/3rd party database.

Additionally, working in conjunction with one or more of the sensors 404, 406 and/or the sensor module 402, the object monitoring system 490 may monitor the first object during transportation of the first object, by the vehicle, from a first location to a second location. Working in conjunction with the processor 420 and/or the computer-readable medium, the object monitoring system 490 may predict potential damage to the first object or a second object based on monitoring one or both of the first object or the force acting on the first object. Finally, working in conjunction with the communication module 422, the processor 420, and/or the computer-readable medium 414, the object monitoring system 490 may generate an alert based on predicting the potential damage. In some implementations, the object monitoring system 490 may be a trained machine learning model, such as an artificial neural network. The machine learning model may be trained to perform various aspects of the present disclosure, such as, but not limited to identifying objects placed within the vehicle 100, monitoring the objects, and predict potential damage.

In some examples, the object monitoring system 490 may further determine relevant characteristics of the vehicle 100 and its operation, where relevance may depend on whether or not the physical characteristic(s) of the vehicle 100 (such as interior stowage space size and shape(s), surface material(s) of the cargo area(s)), as well as driving dynamics associated with the vehicle 100. It should noted that driving dynamics can be information specific to the vehicle itself, e.g., the type of suspension the vehicle chassis relies on to provide its characteristic ride quality, the amount of roll, yaw, pitch, etc. the vehicle may experience during various driving conditions/operations. In some embodiments, such driving dynamics may be gleaned from/based on the driver of the vehicle 100 (current, historical, or both), or some aggregation of information regarding typical or historical use of the vehicle 100. Driving dynamics may also include the resulting impact of the environment on operation of the vehicle 100, such as, road conditions due to weather events, road conditions due to road surface features, etc.

It should be understood that vehicle dynamics may be measured or determined in a number of different ways. In one example, the vehicle dynamics may be a set of properties provided by another party regarding the operation of the vehicle 100. For example, the vehicle manufacturer may be able to provide detailed models regarding how the vehicle acts in different situations. Additionally or alternatively, the vehicle dynamics may be calculated by monitoring forces measured by one or more sensors, such as longitudinal or lateral sensors (embodiments of sensors discussed herein) that can determine one or more dynamics of the vehicle 100. Further still, the vehicle dynamics may be determined using the combination of models provided by another party with measurements regarding how the vehicle 100 reacts. For example, the vehicle dynamics may be determined by utilizing information regarding the center of gravity from a manufacturer in combination with the vehicle's movement (or sway) as the vehicle is operated. In some embodiments, object monitoring system 490 may modify the vehicle dynamics of the vehicle to consider the mass or other physical dimensions of the cargo item(s) when added to the vehicle 100. In some embodiments, object monitoring system 490 may also consider surface-specific dynamics. For example, if an item is placed on the seat, the seat may provide additional shock-absorbing properties that the system may consider. Further still, the system may also consider frictional aspects of one or more vehicle surfaces when considering vehicle dynamics. For example, the vehicle's seat may be made of leather and have a low coefficient of friction, while the trunk of the vehicle may be rubberized and therefore have a much higher frictional coefficient. In still other embodiments, the object monitoring system 490 may modify the vehicle dynamics based on weather.

Figure 5:
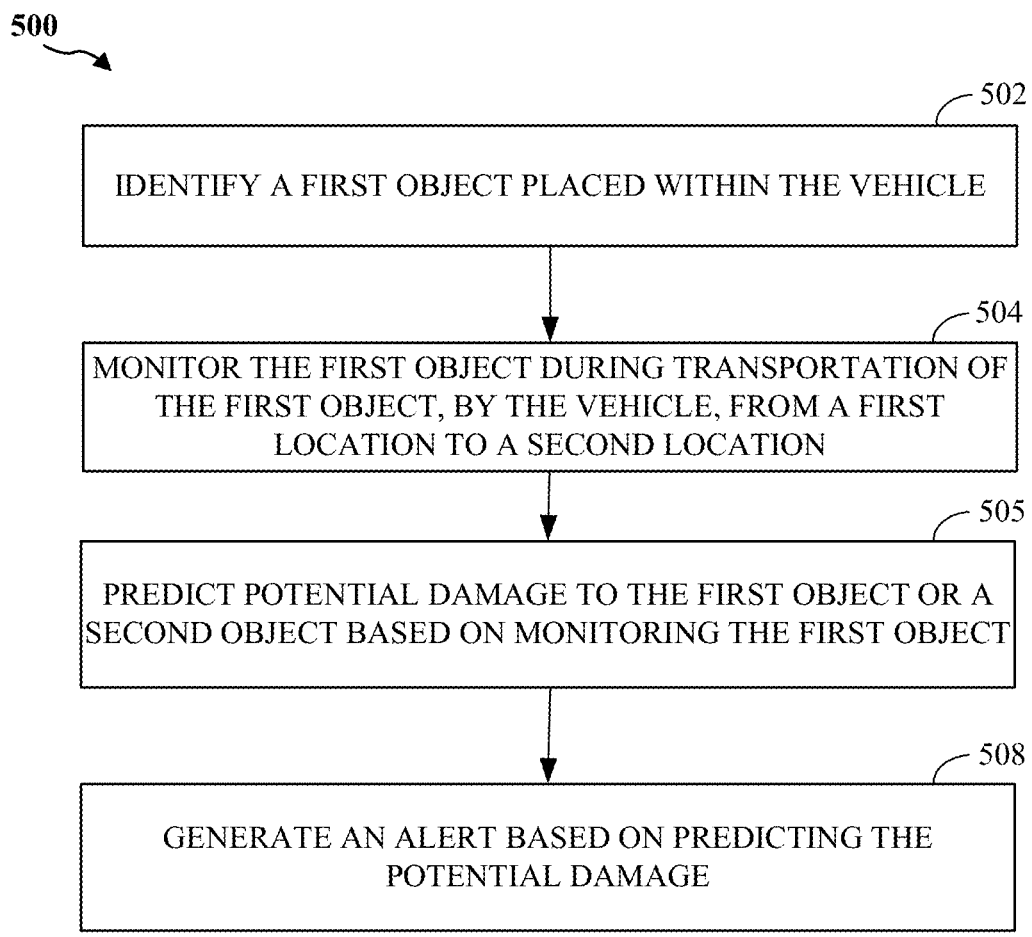
FIG. 5 illustrates a flow diagram for a process for monitoring objects in a vehicle, in accordance with aspects of the present disclosure.

FIG. 5 illustrates a flow diagram for a process 500 for monitoring one or more objects in a vehicle, in accordance with aspects of the present disclosure. The vehicle may be an example of a vehicle 100 described with reference to FIGS. 1, 2, and 4. The example process 500 is an example of monitoring one or more objects in the vehicle. As shown in FIG. 5, the process 500 begins at block 502, by identifying a first object placed within the vehicle. The first object may be identified via one or more sensors integrated with the vehicle.

At block 504, the process 500 monitors the first object during transportation of the first object, by the vehicle, from a first location to a second location. In some examples, the process 500 monitors movement of the first object. Additionally, or alternatively, the process 500 monitors one or more forces, such as gravity, acting on the first object. The movement and/or the forces may be monitored by one or more sensors integrated with the vehicle.

At block 506, the process 500 predicts potential damage to the first object or a second object based on monitoring the first object. In some examples, the potential damage may be predicted based on identifying movement of the first object based on the monitoring. In other examples, the potential damage may be predicted based on predicting that the force acting on the first object will cause the first object to move. In some aspects, the process 500 may predict that movement of the first object may cause damage to the first object. As an example, the first object may collide with a wall of a trunk or another object. Additionally, or alternatively, the potential damage may be predicted based on one or more physical attributes associated with the first object or the second object. The one or more physical attributes include one or more of an object weight, an object type, or an object volume. In some other examples, the process 500 may predict that first object may collide with the second object, thereby damaging the second object.

At block 508, the process 500 generates an alert based on predicting the potential damage. The alert may include one or more of an audible alert, a visual alert, or a haptic alert. In some examples, the alert informs an occupant of the vehicle to modify one or more of driving behavior or a location of the first object The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for monitoring cargo in a vehicle, comprising:
    identifying, via one or more sensors associated with the vehicle, a first object placed within a storage location in the vehicle and a second object within the location;
    determining, at a trained machine learning model via one or more images of the first object, one or more first physical attributes of the first object, the one or more first physical attributes including one or more of a fragility, distribution of weight, or hardness of the first object, the one or more first physical attributes being determined at a first time period;
    determining, at the trained machine learning model via one or more images of the second object, one or more second physical attributes of the second object, the one or more second physical attributes including one or more of a fragility, distribution of weight, or hardness of the second object, the one or more second physical attributes being determined at a second time period;
    updating, at a third time period by the trained machine learning model, the one or more second physical attributes based on changes predicted to occur to the one or more second physical attributes over a period of time from the second time period to the third time period, the third time period being after the second time period;
    monitoring via the one or more sensors, the first object while the vehicle is traveling from a first location to a second location, a view of the first object being obscured from an occupant of the vehicle while the vehicle is traveling from the first location to the second location;
    predicting, based on monitoring the first object, a potential collision between the first object and a second object within the storage location;
    predicting, based on predicting the potential collision, potential damage to the second object in accordance with the one or more second physical attributes and the one or more first physical attributes; and
    generating an alert based on predicting the potential damage to the second object.

2. The method of claim 1, wherein:
    monitoring the first object comprises monitoring movement of the first object; and
    the potential collision is predicted based on identifying movement of the first object in accordance with monitoring the movement of the first object.

3. The method of claim 1, wherein:
    monitoring the first object comprises monitoring a force acting on the first object; and
    the potential collision is predicted based on predicting that the force acting on the first object will cause the first object to move.

4. The method of claim 1, wherein:
    the alert includes one or more of an audible alert, a visual alert, or a haptic alert; and
    the alert informs an occupant of the vehicle to modify one or more of driving behavior or a location of the first object.

5. The method of claim 1, wherein the first object is identified via a trained cargo identifying model based on visual data captured by one or more visual sensors associated with the vehicle.

6. An apparatus for monitoring cargo in a vehicle comprising:
    at least one processor; and
    at least one memory coupled with the at least one processor and storing instructions operable, when executed by the at least one processor, to cause the vehicle:
        identify, via one or more sensors associated with the vehicle, a first object placed within a location in the vehicle and a second object within the location;
        determine, at a trained machine learning model via one or more images of the first object, one or more first physical attributes of the first object, the one or more first physical attributes including one or more of a fragility, distribution of weight, or hardness of the first object, the one or more first physical attributes being determined at a first time period;
        determine, at the trained machine learning model via one or more images of the second object, one or more second physical attributes of the second object, the one or more second physical attributes including one or more of a fragility, distribution of weight, or hardness of the second object, the one or more second physical attributes being determined at a second time period;
        update, at a third time period by the trained machine learning model, the one or more second physical attributes based on changes predicted to occur to the one or more second physical attributes over a period of time from the second time period to the third time period, the third time period being after the second time period;
        monitor, via the one or more sensors, the first object while the vehicle is traveling from a first location to a second location, a view of the first object being obscured from an occupant of the vehicle while the vehicle is traveling from the first location to the second location;
        predict, based on monitoring the first object, a potential collision between the first object and a second object within the storage location;
        predict, based on predicting the potential collision, potential damage to the second object in accordance with the one or more second physical attributes and the one or more first physical attributes; and
        generate an alert based on predicting the potential damage to the second object.

7. The apparatus of claim 6, wherein:
    execution of the instructions that cause the apparatus to monitor the first object further cause the apparatus to monitor movement of the first object; and
    the potential collision is predicted based on identifying movement of the first object in accordance with monitoring the movement of the first object.

8. The apparatus of claim 6, wherein:
    execution of the instructions that cause the apparatus to monitor the first object further cause the apparatus to monitor a force acting on the first object; and the potential collision is predicted based on predicting that the force acting on the first object will cause the first object to move.

9. The apparatus of claim 6, wherein:
the alert includes one or more of an audible alert, a visual alert, or a haptic alert; and
the alert informs an occupant of the vehicle to modify one or more of driving behavior or a location of the first object.

10. The apparatus of claim 6, wherein the first object is identified via a trained cargo identifying model based on visual data captured by one or more visual sensors associated with the vehicle.

11. A non-transitory computer-readable medium having program code recorded thereon for monitoring cargo in a vehicle comprising, the program code executed by at least one processor and comprising:
program code to identify, via one or more sensors associated with the vehicle, a first object placed within a location in the vehicle and a second object within the location;
program code to determine, at a trained machine learning model via one or more images of the first object, one or more first physical attributes of the first object, the one or more first physical attributes including one or more of a fragility, distribution of weight, or hardness of the first object, the one or more first physical attributes being determined at a first time period;
program code to determine, at the trained machine learning model via one or more images of the second object, one or more second physical attributes of the second object, the one or more second physical attributes including one or more of a fragility, distribution of weight, or hardness of the second object, the one or more second physical attributes being determined at a second time period;
program code to update, at a third time period by the trained machine learning model, the one or more second physical attributes based on changes predicted to occur to the one or more second physical attributes over a period of time from the second time period to the third time period, the third time period being after the second time period;
program code to monitor, via the one or more sensors, the first object while the vehicle is traveling from a first location to a second location, a view of the first object being obscured from an occupant of the vehicle while the vehicle is traveling from the first location to the second location;
program code to predict, based on monitoring the first object, a potential collision between the first object and a second object within the storage location;
program code to predict, based on predicting the potential collision, potential damage to the second object in accordance with the one or more second physical attributes and the one or more first physical attributes; and
program code to generate an alert based on predicting the potential damage to the second object.

12. The non-transitory computer-readable medium of claim 11, wherein:
the program code to monitor the first object further comprises program code to monitor movement of the first object; and
the potential collision is predicted based on identifying movement of the first object in accordance with monitoring the movement of the first object.

13. The non-transitory computer-readable medium of claim 11, wherein:
the program code to monitor the first object further comprises program code to monitor a force acting on the first object; and
the potential collision is predicted based on predicting that the force acting on the first object will cause the first object to move.

14. The non-transitory computer-readable medium of claim 11, wherein:
the alert includes one or more of an audible alert, a visual alert, or a haptic alert; and
the alert informs an occupant of the vehicle to modify one or more of driving behavior or a location of the first object.

15. The non-transitory computer-readable medium of claim 11, wherein the first object is identified via a trained cargo identifying model based on visual data captured by one or more visual sensors associated with the vehicle.

* * * * *